US010371901B2

(12) United States Patent
Kaplan

(10) Patent No.: US 10,371,901 B2
(45) Date of Patent: Aug. 6, 2019

(54) FIELD INSTALLABLE CONNECTOR SYSTEM FOR DROP CABLES AND THE LIKE

(71) Applicant: Multilink Inc., Elyria, OH (US)

(72) Inventor: Steve E. Kaplan, Elyria, OH (US)

(73) Assignee: Multilink Inc., Elyria, OH (US)

( * ) Notice: Subject to any disclaimer, the term of this patent is extended or adjusted under 35 U.S.C. 154(b) by 57 days.

(21) Appl. No.: 15/378,700

(22) Filed: Dec. 14, 2016

(65) Prior Publication Data

US 2017/0176693 A1   Jun. 22, 2017

Related U.S. Application Data

(60) Provisional application No. 62/270,275, filed on Dec. 21, 2015.

(51) Int. Cl.
*G02B 6/38* (2006.01)

(52) U.S. Cl.
CPC ........ *G02B 6/3887* (2013.01); *G02B 6/387* (2013.01); *G02B 6/3849* (2013.01)

(58) Field of Classification Search
None
See application file for complete search history.

(56) References Cited

U.S. PATENT DOCUMENTS

| | | | |
|---|---|---|---|
| 4,146,299 A * | 3/1979 | Wellington | G02B 6/3878 385/59 |
| 4,679,895 A * | 7/1987 | Huber | G02B 6/3887 385/81 |
| 5,287,425 A | 2/1994 | Chang | |
| 5,428,703 A | 6/1995 | Lee | |
| 7,090,406 B2 | 8/2006 | Melton et al. | |
| 8,885,998 B2 * | 11/2014 | Marcouiller | G02B 6/2558 385/100 |
| 8,931,963 B2 | 1/2015 | Scopie et al. | |

(Continued)

OTHER PUBLICATIONS

FOSCO. Fiber Optics for Sale Co., "Fiber Optic Connector Tutorial", downloaded Dec. 14, 2015 from http://www.fiberoptics4sale.com/Merchant2/fiber-optic-connectors.php, pp. 1-14.

(Continued)

*Primary Examiner* — Chad H Smith
(74) *Attorney, Agent, or Firm* — Renner, Otto, Boisselle & Sklar, LLP

(57) ABSTRACT

A field installable connector system for an optical cable includes a clamp, including a plurality of clamp members, cable guiding space in at least one of the clamp members, the cable guiding space configured to guide an optical cable in position in the clamp, connector receiving space in the clamp configured to receive at least part of a connector connected to the optical cable, a stop configured to block withdrawal of the connector from the clamp, and a housing having a clamp receiving space configured to receive at least part of the clamp and to urge clamp parts together to retain in the clamp at least part of the connector. A strain relief also may be provided. A method of assembling a field installable connector system for an optical cable includes placing an optical connector, optical cable and clamp in a hollow housing that holds the clamp relative to the optical connector and optical cable; and applying a strain relief.

23 Claims, 5 Drawing Sheets

(56) References Cited

U.S. PATENT DOCUMENTS

| | | | |
|---|---|---|---|
| 2005/0053342 A1* | 3/2005 | Melton | G02B 6/4471 385/113 |
| 2014/0241570 A1 | 8/2014 | Barnette, Jr. et al. | |
| 2014/0241670 A1 | 8/2014 | Barnette, Jr. et al. | |

OTHER PUBLICATIONS

"Fiber Optic ConnectorTutorial", http://www.fiberoptics4sale.com/Merchant2/fiber-optic-connectors.php, (no date given, but printed from internet on Dec. 4, 2015), 14 pages.

* cited by examiner

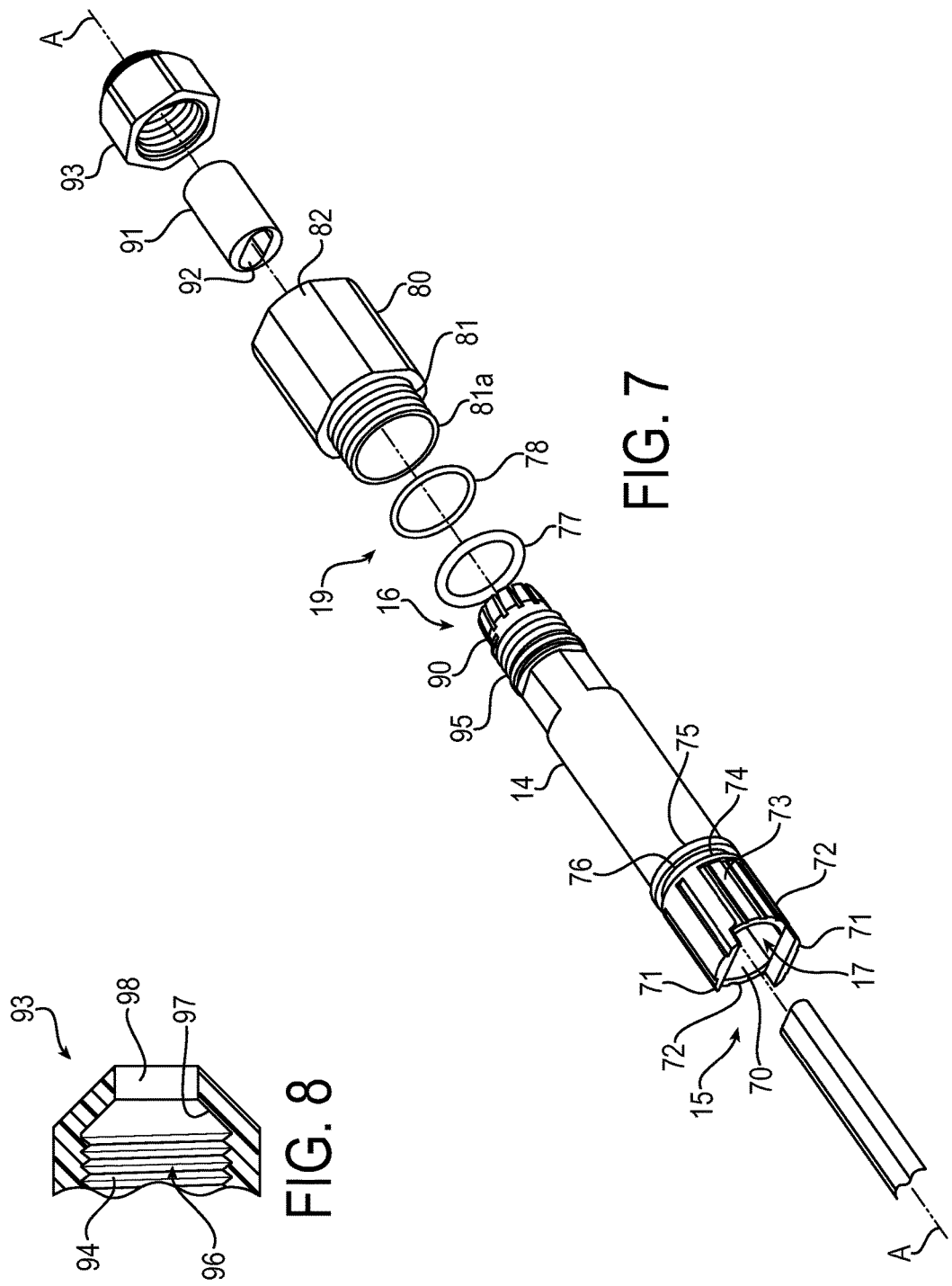

FIELD INSTALLABLE CONNECTOR SYSTEM FOR DROP CABLES AND THE LIKE

Priority and/or the benefit of U.S. Provisional Patent Application No. 62/270,375, filed Dec. 21, 2015 is claimed. The entire disclosure of this application is hereby incorporated by reference.

TECHNICAL FIELD

This disclosure relates generally to connector systems for terminating fiber optic cables and, more particularly, to a field installable connector system, also referred to as termination system, for drop cables and the like.

BACKGROUND

In the past optical connectors for fiber optic cables typically were assembled to the fiber optic cables at the factory. An example of an optical connector is known as an SC connector. The procedure to secure the optical connector and fiber optic cable required crimping parts to assure a secure mechanical connection via which optical signals may be transmitted and/or received between the fiber optic cable and optical connector and the device to which the optical connector may be attached. To perform the mentioned crimping, a special crimping tool typically was required; such a tool may be rather large and difficult or cumbersome to use when in the field. Thus, factory assembling of the optical connector and the fiber optic cable has been common.

SUMMARY

The need for factory assembling of fiber optic cables and connectors (also referred to herein as optical connectors) disadvantageously means that a purchaser would have to specify the desired length of fiber optic cable when placing an order. However, when that fiber optic cable and connector would be installed for use, the installer may find that a different length fiber optic cable may be preferred and may have to cut and/or trash some fiber optic cable. However, it was difficult, may not have been possible, or was inconvenient due to the special equipment required for crimping, to change the length of the fiber optic cable for a given installation.

Briefly, this disclosure provides for terminating a fiber optic cable (also referred to herein as optical cable) and, for example, facilitating carrying out such terminating in the field, e.g., during installing of the fiber optic cable for some function, etc. Crimping is not required.

In the detailed description below the disclosure is directed to terminating an optical cable by an SC connector; however, it will be appreciated that the disclosure may be used for terminating an optical cable using other types of connectors.

A termination system for an optical cable of this disclosure includes a clamp, which is formed of plural clamp members, that is positioned with respect to an optical connector and associated optical cable, the clamp being positioned in a housing that applies pressure or force to urge the clamp members together as they hold the optical connector and the optical cable.

Optionally the optical connector and optical cable may be attached to each other in the field and then the clamp may be positioned with respect to the optical connector and optical cable and then positioned in the housing.

Also optionally a strain relief may be provided to resist pulling of the optical cable out from the housing.

Additional aspects and features of the field installable connector system of this disclosure are summarized below.

According to an aspect of this disclosure a termination system for an optical cable, includes a clamp, including a plurality of clamp members, cable guiding space in at least one of the clamp members, the cable guiding space configured to guide an optical cable in position in the clamp, connector receiving space in the clamp configured to receive at least part of a connector connected to the optical cable, a stop configured to block withdrawal of the connector from the clamp, and a housing having a clamp receiving space configured to receive at least part of the clamp and to urge clamp parts together to retain in the clamp at least part of the connector.

Optionally, the termination system further includes an optical connector and optical cable, the optical connector being configured to be assembled with the optical cable in the field, the optical connector comprising a connector housing including a light transmissive connection to a fiber optic member of the optical cable, a ferrule attachable to the connector housing to hold the fiber optic member of the optical cable to the connector housing in optical connection with the light transmissive connection, the fiber optic member extending through the housing from an entrance end of the housing to the optical connector.

Optionally, the connector receiving space in the clamp is configured to mate with at least part of the connector housing and ferrule for positioning and retaining them in the clamp.

Optionally, the termination system further includes a strain relief configured to resist pulling of the fiber optic cable out from the housing, and wherein the clamp resists pulling of the optical connector out from the housing.

Optionally, the connector, clamp and housing are field installable with respect to an optical cable.

Optionally, the clamp members are positionable in relation to each other to form a tube.

Optionally, the tube has an entrance end, an exit end, and a hollow interior portion in which the connector is retained at the exit end and through which a fiber optic member of an optical cable may extend from the entrance end to the connector.

Optionally, the tube is at least partly positionable in the clamp receiving space, and wherein at least one of the clamp receiving space or the clamp includes a feature that provides an interference fit of the clamp in the clamp receiving space to urge the clamp members together.

Optionally, the feature that provides an interference fit comprises a tapered portion of the hollow portion of the tube in at least a portion of the clamp receiving space.

Optionally, the tapered portion is of a varying cross-sectional dimension along at least part of its length, whereby as the clamp is inserted into the clamp receiving space along an axial extent of the tapered portion, the clamp members are urged together and the clamp becomes securely retained in the housing and retains the connector in the clamp.

Optionally, the clamp securely holds the connector in response to urging together of the clamp members by the housing.

Optionally, at least one of the clamp receiving space or at least one of the clamp members is tapered to increase urging of the clamp members together in response to increasing the amount of inserting of the clamp members into the clamp receiving space.

Optionally, the termination system further includes a fastener configured to hold the clamp members together.

Optionally, the fastener comprises cooperative male and female members respectively on one or more of the clamp members.

Optionally, at least one male member comprises a male protrusion with a tab surface of one clamp member, and at least one female member comprises a mating ledge for engagement by the tab surface.

Optionally, the termination system further includes alignment guides configured to align the clamp members with respect to each other in position for attaching to each other.

Optionally, the alignment guides comprise a recess in one clamp member and a protruding pin member in the other clamp member configured for inserting into the recess.

Optionally, the clamp is generally cylindrical and extends in an axial direction along the length thereof, wherein the cable guiding space extends in the clamp toward the connector receiving space along the direction of the clamp.

Optionally, the clamp includes strength member receiving space to receive a strength member of a fiber optic cable.

Optionally, the housing includes a tubular member having a hollow axial passage therein, the passage having an entrance end and an exit end, the clamp receiving space at the exit end of the passage, the passage of the tubular member configured for an optical cable located therein to extend from the entrance end to a connector at the connector receiving space; and the termination system further includes a strain relief coupling for a fiber optic cable, including a plurality of fingers extending at the entrance end of the hollow tubular member in a direction generally parallel to the axial extent of the passage, a resilient sleeve positionable around a fiber optic cable, the resilient sleeve of a size as to fit resiliently at least part way in the entrance end engaged with a plurality of the fingers, and an urging member positionable on the tubular member at the entrance end configured to urge the fingers into engagement with the resilient sleeve to tend to retain the resilient sleeve in the tubular member and to urge the resilient sleeve toward the fiber optic cable to tend to retain the fiber optic cable in the tubular member.

Optionally, the resilient sleeve, hollow tubular member urging member are cooperative with a fiber optical cable retained thereby to provide a fluid-tight seal.

Optionally, the termination system further includes a strain relief coupling for a fiber optic cable, including a plurality of fingers extending at the entrance end of the hollow tubular member in a direction generally parallel to the axial extent of the passage, a resilient sleeve positionable around a fiber optic cable, the resilient sleeve of a size as to fit resiliently at least part way in the entrance end engaged with a plurality of the fingers, and an urging member positionable on the tubular member at the entrance end configured to urge the fingers into engagement with the resilient sleeve to tend to retain the resilient sleeve in the tubular member and to urge the resilient sleeve toward the fiber optic cable to tend to retain the fiber optic cable in the tubular member.

Another aspect of this disclosure relates to a strain relief coupling for a fiber optic cable, including a hollow tubular member having an entrance end in which a fiber optic cable may be located, the tubular member having an axial extent, at least part of the entrance end having a plurality of fingers extending in a direction generally parallel to the axial extent, a resilient sleeve positionable around a fiber optic cable, the resilient sleeve of a size as to fit resiliently at least part way in the entrance end engaged with a plurality of the fingers, and an urging member positionable on the tubular member at the entrance end configured to urge the fingers into engagement with the resilient sleeve to tend to retain the resilient sleeve in the tubular member and to urge the resilient sleeve toward the fiber optic cable to tend to retain the fiber optic cable in the tubular member.

Another aspect of this disclosure relates to a method of assembling a termination system for a connectorized optical cable, including placing relative to each other a hollow housing and an optical connector that has an optical cable attached thereto such that the optical cable extends in the hollow housing and exits both ends of the hollow housing such that the optical connector is exposed outside the hollow interior of the hollow housing, placing clamp members about at least part of the optical connector with at least part of a fiber optic member extending in a path in at least one of the clamp members, aligning the clamp members to provide an enclosure for at least part of the optical connector and fiber optic member and to retain the optical connector and fiber optic member in the clamp, inserting the clamp members with the optical connector and fiber optic member therein in the hollow housing such that upon such inserting the housing and the clamp members cooperate to urge the clamp members together to tend to resist withdrawing of the clamp and the optical connector from the hollow housing.

Optionally, the method further includes applying a strain relief at the entrance of the housing to resist pulling out of the optical cable from the housing.

These and other aspects and features of this disclosure will be clear with reference to the following description and drawings, in which embodiments are disclosed to indicate some ways for implementing the principles of the present disclosure. However, it will be appreciated that the scope of the present disclosure is not limited thereto. On the contrary, the present disclosure includes any change, modification and equivalent falling within the scope, spirit and connotation of the accompanying claims.

The term "include/comprise" herein refers to the existence of feature, element, step or component, not excluding the existence or addition of one or more other features, elements, steps, components or combinations thereof.

Various aspects of the present disclosure can be better understood with reference to the following drawings. The components in the drawings are not necessarily drafted to scale, and the emphasis is laid upon clearly illustrating the principles of the present disclosure. For the convenience of illustrating and describing some parts of the present disclosure, corresponding parts in the drawings may be enlarged in size, e.g., enlarged to be larger than the case in an exemplary device actually made according to the present disclosure, relative to other parts. Components and features depicted in one drawing or embodiment of the present disclosure may be combined with components and features depicted in one or more additional drawings or embodiments. Moreover, in the drawings, the same reference signs designate corresponding parts throughout the drawings and may be used to designate the same or similar parts in at least one embodiment.

BRIEF DESCRIPTION OF THE DRAWINGS

The included drawings are used for providing further understandings of the present disclosure, and they constitute a part of the Specification. Those drawings illustrate the preferred embodiments of the present disclosure and elaborate the principles of the present disclosure together with the descriptions.

In the drawings:

FIG. 7 is an enlarged fragmentary isometric view of the housing and strain relief of the termination system; and FIG. 8 is an elevation section view of the cap of the strain relief of the termination system.

DESCRIPTION

Figure 1:
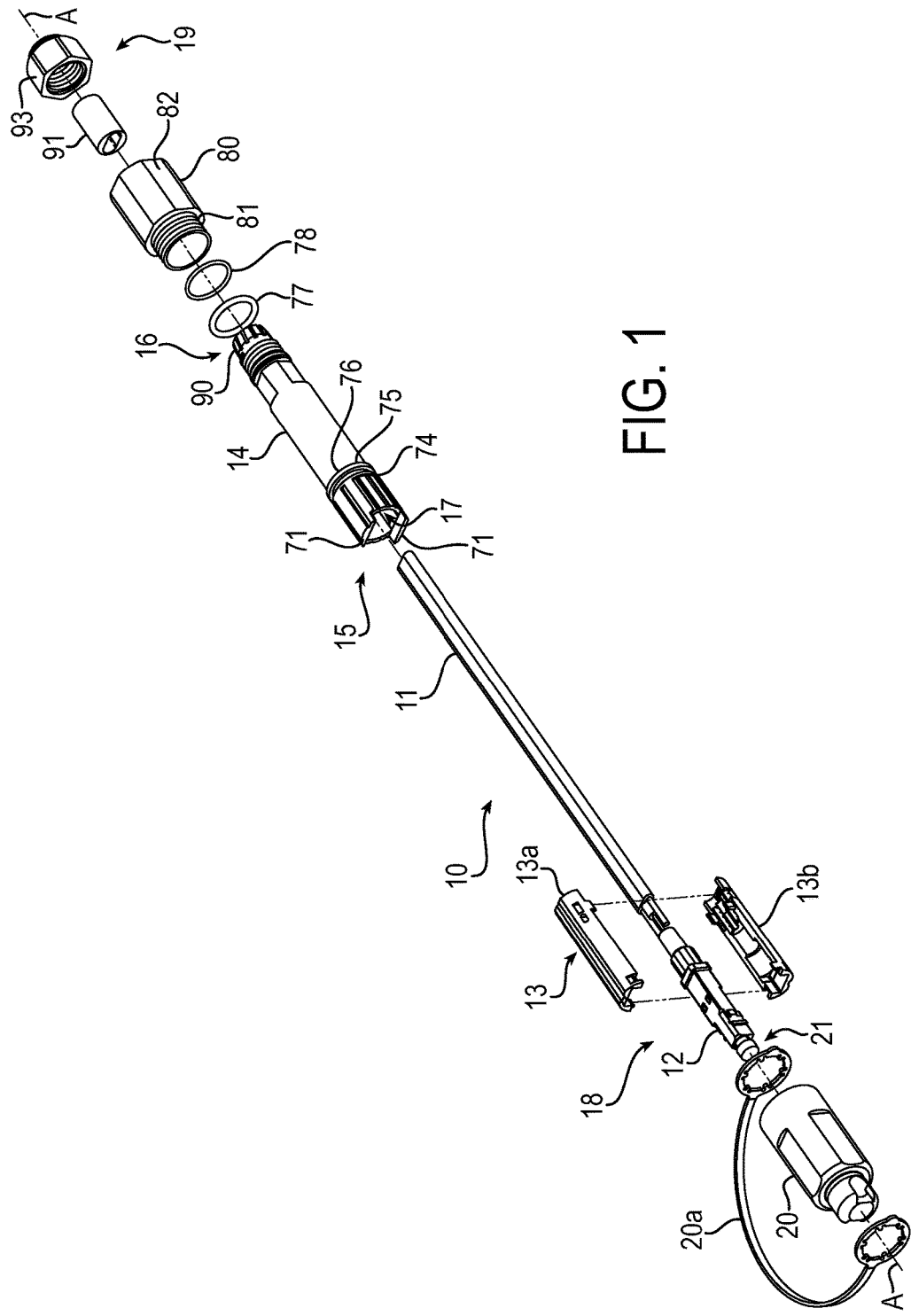
FIG. 1 is an exploded isometric view of a termination system for an optical cable that is attached to an optical connector.

Referring to the drawings, wherein like reference numerals designate like parts in the several figures, a termination system 10 for a fiber optical cable 11 (sometimes referred to herein as optical cable) is illustrated. As is described below, the termination system 10 may be installed in the field, e.g., at a job site, etc.; or it may be installed at a factory, at the facility of an optical cable distributor, and so on. The termination system 10 may be installed with respect to an optical cable 11 that already has attached to it an optical connector 12 (sometimes referred to herein as connector) or the termination system 10 and the connector 12 may be installed on the cable 11 at the same time, e.g., in the field, in a factory, at a distributor's business, and so on. An exemplary connector is an SC connector, and an exemplary optical cable may be a flat drop cable; but it will be appreciated that this disclosure may be used with other optical connectors and/or other optical cables.

As is illustrated in FIG. 1, the termination system 10 includes a clamp 13 formed of a plurality of clamp members, for example, two clamp members 13a, 13b. However, there may be more than two clamp members, or as an alternative and equivalent, the clamp members may be coupled as a single clamp member hinged or otherwise connected to form the clamp, as is described below. The termination system also includes a housing 14 that has an entrance end 15 and an exit end 16. The housing 14 has a hollow interior portion 17. At least part of the clamp 13 is insertable into the entrance end 15 into the hollow interior of the housing 14. The hollow interior of sufficient size and configuration for the optical cable 11 to pass therethrough to exit from the exit end 16.

For convenience of the description, the left side of the termination system 10 as viewed in the drawings, e.g., as viewed in FIG. 1 and in the other drawing figures, is referred to as the forward, front, entrance and the like of respective parts of the termination system; and the right side as rear, rearward, back, exit and the like. Also, for convenience of the description, an axis A is illustrated extending generally from the entrance to the exit ends of the termination system, e.g., generally along the extent illustrated in FIG. 1.

To assemble the termination system 10 with respect to an optical cable 11, which already is attached to a connector 12, the clamp members 13a, 13b of the clamp 13 and the optical cable 11 and connector 12 are placed with respect to each other such that in the direction generally represented by axis A, the clamp encircles or at least substantially encircles or covers the axially extending exterior surfaces of at least part of each of the optical cable and connector. With the optical cable 11, connector 12 and clamp 13 so assembled as a sub-assembly 18, the clamp members form a tube at least partly holding therein part of the connector 12 and possibly also part of the optical cable 11, and that sub-assembly is pushed at least partway into the hollow interior 17 of the housing 14 via the entrance end 15. The clamp 13 and the housing 14 are cooperative such that the housing applies force or pressure against the clamp members both to urge the clamp members together to hold securely to the optical cable 11 and to the connector 12, and also to retain the clamp sub-assembly 18 at least part way in the hollow interior 17 of the housing 14.

A strain relief mechanism 19 is provided at the exit end 16 of the housing 14. The strain relief mechanism 19 tends to prevent the optical cable 11 from being pulled out from the exit end of the assembled termination system 10.

A dust cap 20 may be provided to cover the optical connection end 21 of the connector 12. A tether 20a may be used to attach the dust cap 20 to the termination system 10, either permanently or temporarily, as desired.

Figure 2:
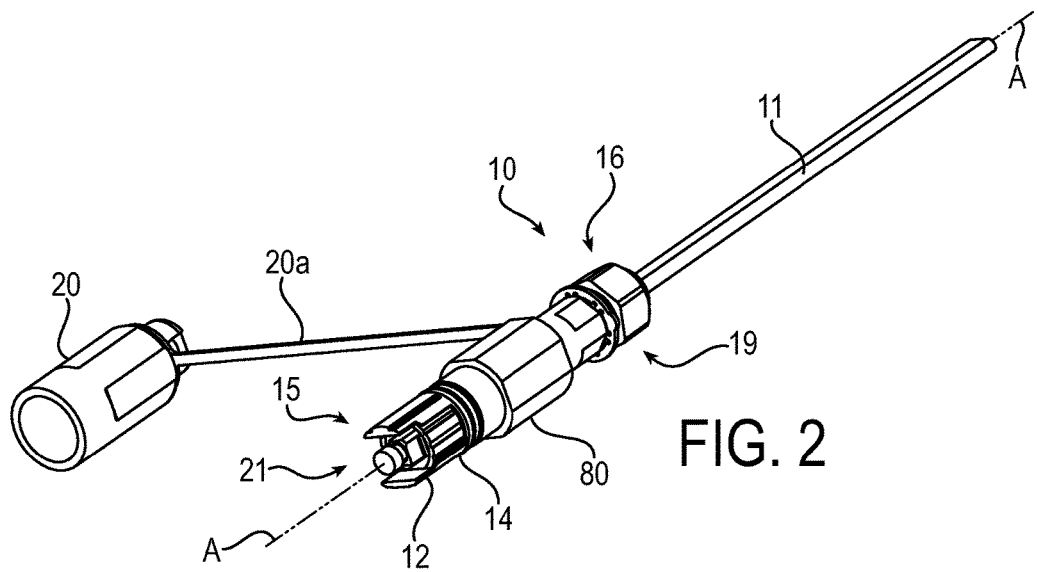
FIG. 2 is an isometric view of the termination system of FIG. 1 in substantially assembled configuration, but with a separated dust cap.
Figure 3:
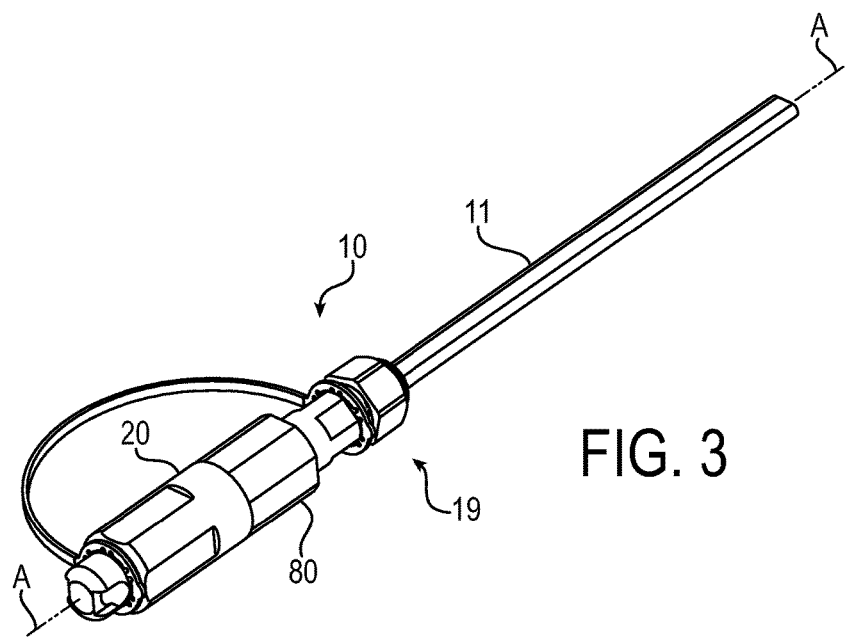
FIG. 3 is an isometric view of the termination system similar to FIG. 2, but with the dust cap assembled.

In FIGS. 2 and 3 the termination system 10 is illustrated assembled with respect to the optical cable 11 and connector 12. In FIG. 2 the housing 14 is seen with the optical connection end 20 of the connector 12 exposed at the entrance end 15 and with the strain relief 19 at the exit end 16 of the housing 14. Moreover, in FIG. 2 the dust cap 20 is shown spaced away from and unassembled with respect to the housing 14, but still coupled via the tether 20a to the housing 14 of the termination system 10. In FIG. 3 the dust cap 20 is shown assembled to the housing 14, for example, by screwing it onto threads 22 (FIG. 1).

Figure 4:
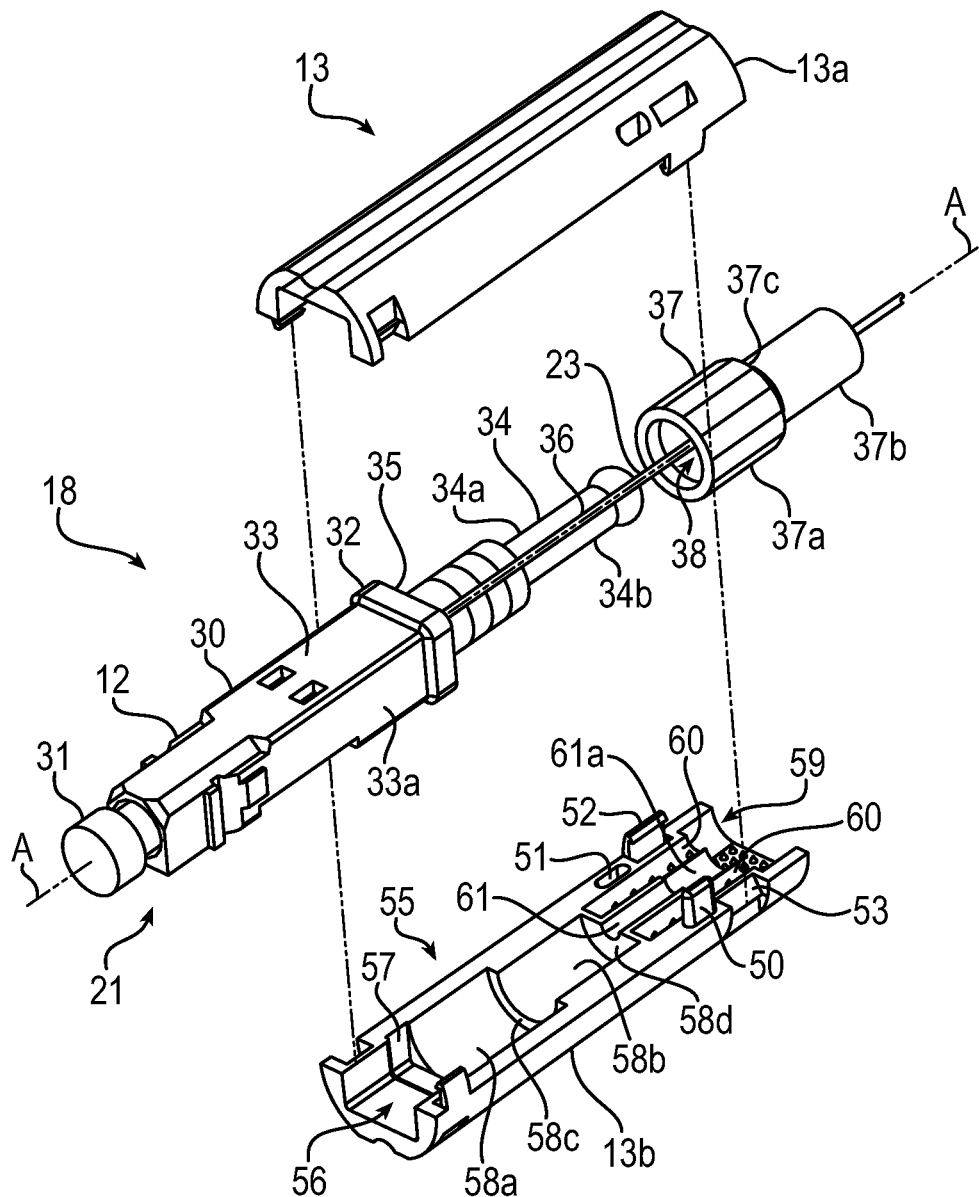
FIG. 4 is a fragmentary exploded isometric view of the termination system including the optical connector and part of the optical cable, the ferrule being shown spaced apart from the optical connector to illustrate field installable properties.
Figure 5:
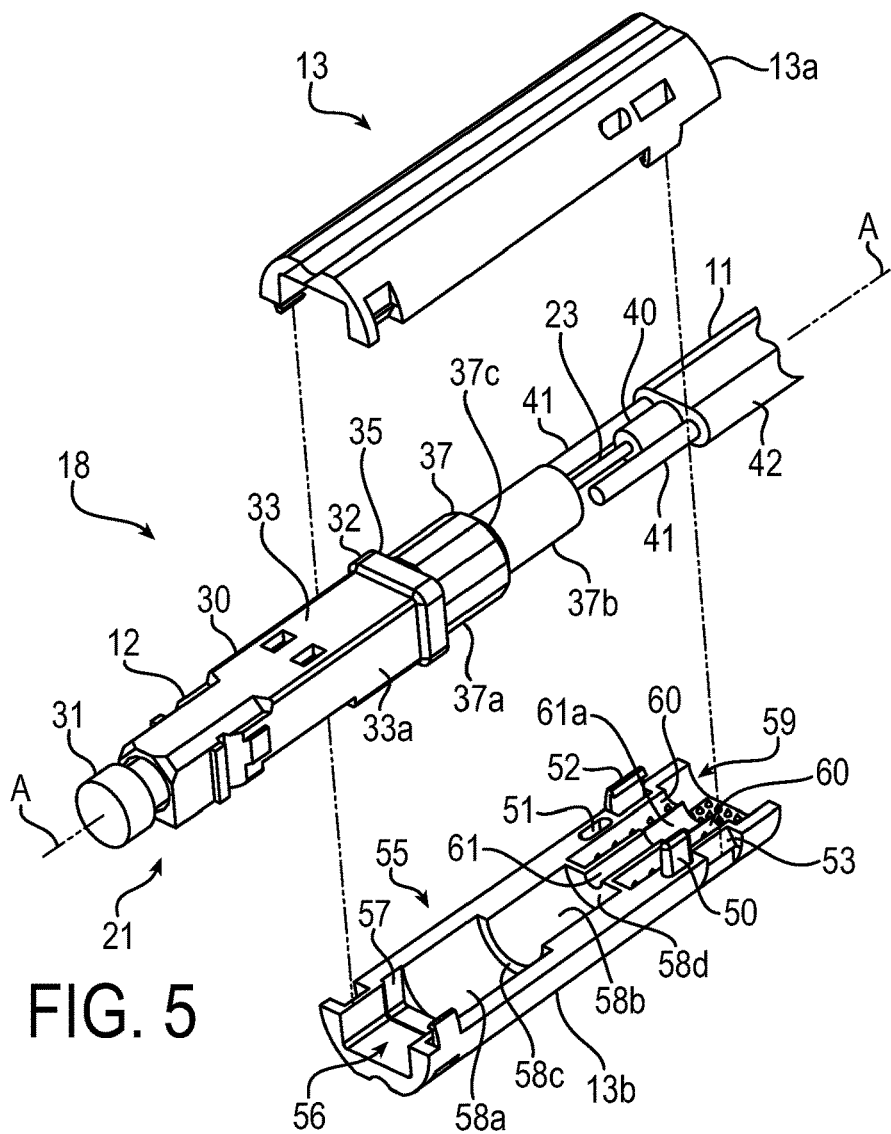
FIG. 5 is another enlarged fragmentary exploded isometric view of the termination system as shown in FIG. 4 showing the ferrule and fiber optic cable installed or attached to the optical connector.

Turning to FIGS. 4 and 5, enlarged views of the connector 12 and clamp 13 and their relation to the optical cable 11 and to the fiber optic member 23 of the optical cable are illustrated. (The main difference between FIGS. 4 and 5 is that in FIG. 4 the ferrule 37, which is described further below, is shown "exploded" from the connector 12, and in FIG. 5 the ferrule is shown attached to and as part of the connector 12.) The connector 12 includes a basic housing 30 in which is an optical coupling apparatus or member (not shown) intended to provide optical connection between a fiber optic member 23 of the optical cable 11 and another device that is not shown in this drawing. At the optical connection end 21 (forward end—shown at the left side of the drawings) of the connector 12 is a protective cover 31 that protects the optical connection member that is in the basic housing 30. The protective cover 31 may be removed when the connector 12 is connected to another device, for example, being mechanically connected to the other device while also providing for optical connection with an optical member of the other device so that optical signals can be transmitted therebetween.

A flange 32 is at or near the back end or rear end of the basic housing 30. The flange 32 circumscribes the outside surface 33 of the basic housing 30 about the axis A. In the illustration of the connector 12 and basic housing 30 thereof the basic housing is generally of a shape that has a generally rectangular cross section, and the various dimensions and features at the exterior surface of the basic housing 30 are made according to, for example, the device to which the connector 12 is to be connected and/or the configuration of the clamp 13 as will be described further below. As is shown, the flange 32 is raised above the plane of the various surfaces, e.g., of the outside surface 33, of the basic housing 30 of the connector 12. One known type of connector 12 that is used for coupling optical signals is referred to as an SC connector, as is mentioned above, and features of this disclosure are described with respect to an SC connector. However, those features also may apply to use with a type of connector other than an SC connector, as will be appreciated.

An SC connector 12 has a pigtail-like protrusion 34 that extends out from the back 35 of the connector. A groove or slot 36 in the protrusion provides a protected space for holding, guiding and/or leading a fiber optic member 23 in position in the connector 12 to couple optical signals with an optically conductive device in the connector body. Optical signals can be transmitted and/or received with respect to the fiber optic member 23 and another device via the connector 12.

A hollow ferrule 37 is attached to the back end of the basic housing 30 of the connector 12. The ferrule may be positioned over the protrusion 34 and be screwed on a thread (not seen in the drawing) at the back 35 of the basic housing 30. That thread on the basic housing 30 interacts with a thread in the ferrule 37 so that the ferrule can be screwed onto that thread and, therefore, be attached to the basic housing 30. The ferrule 37 has a hollow interior 38 to provide space through which a fiber optic member 23 of the optical cable 11 may pass to enter the connector 12 for optical coupling with the optically conductive member that is in the basic housing 30. As is the case with a standard SC connector, the hollow interior 38 of the ferrule 37 is tapered or otherwise configured to cooperate with the pigtail-like protrusion 34 to urge portions 34a, 34b of the protrusion on opposite sides of the slot 36 toward each other to tend to hold the fiber optic member 23 to tend to prevent the fiber optic member from being pulled out from the connector 12.

Figure 6:
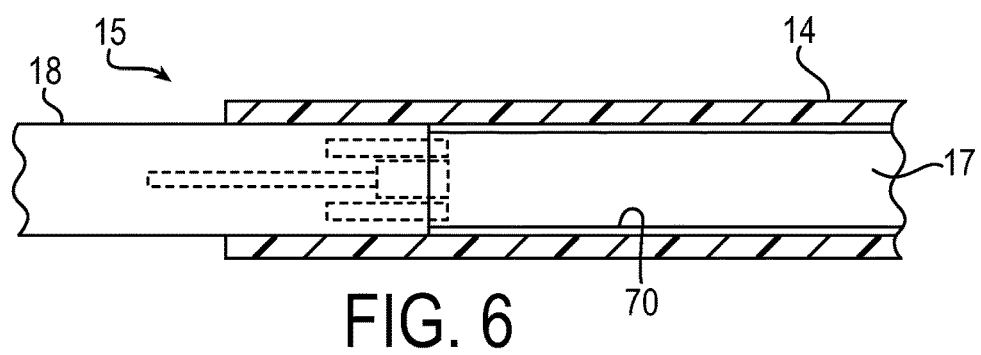
FIG. 6 is a fragmentary isometric view illustrating the clamp and connector subassembly positioned at least part way in the housing of the termination system.

The ferrule 37 includes two generally cylindrical portions 37a, 37b of different diameters. These facilitate manual grasping of them to attach and to remove the ferrule with respect to the threaded connection with the basic housing 30. Moreover, the relatively forward cylindrical portion 37a may have a number of flat surfaces, as is illustrated in FIGS. 4-6, for example, to facilitate secure manual grasping and manipulation of the ferrule 37. The design of the ferrule 37, including, the axial length, for example, generally along, parallel to and/or concentric with the axis A, and the diameters of the respective portions 37a, 37b are coordinated with the configuration of the clamp members 13a, 13b, as is described further below. Such coordinated configuration, e.g., diameter, length, shape, etc., with the clamp members facilitates proper placement of the ferrule 37 and connector 12 in the clamp 13 and holding the connector by the clamp.

Since the termination system 10 can be installed in the field, the SC connector can be installed with respect to the fiber optic member 23 of the optical cable 11 in the field. Therefore, for example, in the field the optical cable 11 can be cut to desired length, the fiber optic member 23 can be exposed, e.g., exposed from protective covering, and coupled to the connector 12, the subassembly 18 can be assembled and inserted in the housing 14, and the strain relief 19 can be secured to complete the termination system 10, as is described herein.

The optical cable 11 includes the fiber optic member 23 that is covered by a protective sheath 40. The optical cable 11 also includes one or more strength members 41 (two are shown in the particular optical cable 11 in FIGS. 1, 4 and 5, but the optical cable may have more or fewer strength members). The strength members may be made of metal material or some other material that provides strength to the optical cable 11 to avoid various damage possibilities, including stretching, for example. The strength members 41 may be electrically conductive to provide for discharge of static electricity or the like. A cable jacket 42 holds the fiber optic member 23, its surrounding sheath 40, and the strength members 41 as a unit forming optical cable 11. The optical cable 11 may be virtually any optical cable of the flat drop cable type or another type. If the cable is another type, appropriate adjustments in the configuration of the clamp members 13a, 13b, etc., e.g., size, shape, and so on of the various spaces, grooves, stop surfaces, and so on, may be made or designed to provide the functions described herein to obtain the field installable connector system of this disclosure.

In FIGS. 4 and 5 the clamp 13 and its relationship to the connector 12 and fiber optic cable 11 are illustrated in enlargement. The two clamp members 13a, 13b may be substantially identical. They are of a shape or shapes to fit together to enclose at least part of the connector 12 and optical cable 11. The two clamp members 13a, 13b may be aligned for attachment to each other using alignment guide pins 50 and guide slots 51, which are near the back end of the clamp members 13a, 13b. In the illustration of FIGS. 4 and 5, only the guide pin 50 and guide slot 51 of the clamp member 13b is seen; corresponding guide pin of the clamp member 13a would be aligned to be inserted in the guide slot 51 of the clamp member 13b. Similarly, the guide pin 50 of clamp member 13b may be aligned with and inserted into a corresponding guide slot in the clamp member 13a. Further, male attachment tabs 52 and female attachment ledges 53 are provided at a number of locations of the clamp members 13a, 13b, as are illustrated. The tabs 52 may snap over respective ledges 53 to hold the clamp members 13a, 13b together in a sense to sandwich within the interior 55 of the clamp 13 at least part of the connector 12 and optical cable 11. The interior space 55 is a connector receiving or containing area for at least part of the connector as well as an optical cable receiving and retaining area for at least part of the optical cable 11 and/or of components there, such as the fiber optic member 23 and strength members 41.

At the forward end of the clamp 13 the interior 55 has a generally rectangular shape entrance area 56 configured to mate relatively smoothly, unimpeded and securely with at least a portion of the basic housing 30 of the connector 12, such as portion 33a of the exterior surface 33 of the basic housing 30. If the basic housing 30 portion 33a were of a different shape than that shown, then the area 56 of the clamp 13 would be configured to correspond to that shape portion 33a of the connector body. Deeper into the interior 55 of the clamp members 13a, 13b is a recess, groove or slot 57 that is configured to receive the flange 32 of the connector housing 30. The flange fits into that recess, groove or slot 57. The walls of the recess 57 hold the connector body to prevent movement of the connector 12 relative to the clamp 13. Thus, those walls provide a stop function to maintain the mechanical positioning of the connector 12 in the clamp 13, especially to stop axial movement (e.g., along or parallel to axis A) between the connector and clamp.

The interior 55 of the clamp 13 also includes spaces or volumes 58a, 58b, which are configured to receive in relatively close fitting relation the relatively larger diameter portion 37a of the ferrule 37 and the relatively smaller diameter portion 37b of the ferrule. There is a step 37c between the portions 37a, 37b of the ferrule, and there is similarly a step 58c between the space or volume 58a, 58b portions of the clamp members 13a, 13b. The steps 37c, 58c cooperate with each other to restrict relative movement between the connector 12 and the clamp 13. The step 58c and a back wall 58d of the space 58b provide stop functions to restrict axial movement of the connector 12 in the clamp 13, especially to stop axial movement (e.g., along or parallel to axis A) between the connector and clamp.

A space 59 at the back end of the clamp 13 is of a shape to receive the optical cable 11 at the leading end where the jacket 42 covers the fiber optic member 23 in its protective sheath 40 and also the strength members. Also, near the back end of the clamp is one or more recess, groove or slot 60 intended to receive an exposed end of a strength member, such as the ends of the strength members 41 that are exposed outside of the cable jacket 42, as is seen in FIGS. 1, and 5, for example. If desired, the cross-sectional dimension, e.g., analogous to diameter, of the recesses 60 may be the same or slightly larger than the cross-sectional dimension or diameter of the strength members so that they fit easily in the recesses. Alternatively, the cross-sectional dimension or diameter of the recesses 60 may be slightly smaller than that of the strength members so that upon attaching the clamp members 13a, 13b to each other and urging them toward each other, the clamp 13 material may deform slightly to provide a frictional or mechanical connection to hold to the strength members. The clamp may be made of a material, such as plastic or some other material that has some degree of resilience or ability to deform so as to deform about the strength members to retain them securely in the clamp, thus also keeping the clamp 13 and optical cable 11 in relatively fixed positional relation to each other. Also, the space 59 and the optical cable 11 in that space may be cooperative such that the clamp squeezes against the cable to help hold the cable and clamp in fixed relation.

The interior 55 of the clamp 13 also includes a guide recess, groove or slot 61 to receive, guide and protect the fiber optic member 23, which, as is illustrated, is aligned with an opening in the back of the ferrule 37, as is mentioned above. The back end 61a of the guide 61 for the fiber optic member is enlarged relative to the forward end; the larger space at the back end 61a receives the exposed sheath 36 that surrounds the fiber optic member 35.

Summarizing, then, to assemble the clamp 13, connector 12 and optical cable 11, the connectorized cable, e.g., as is illustrated with the optical cable 11 having been attached to the connector 12 either in the field, at the factory, or elsewhere, as is shown in FIGS. 4 and 5, is coupled to the clamp 13 by placement in one of the clamp members, e.g., clamp member 13b. In this regard, the strength members 41 are placed into the recesses 60 in one of the clamp members, such as clamp member 13b, and the sheath 40 and fiber optic member 23 are placed respectively in the recesses 61a, 61. The portions 37a, 37b of the ferrule 37 are placed in the respective recesses or spaces 58a, 58b of the clamp member 13b, and the flange 32 is placed in the recess 57. The portion 33a of the basic housing 30 of the connector 12 is positioned in the recess 57 of the clamp member 13b. Then the other clamp member, e.g., clamp member 13a, is attached to the clamp member 13b with the various portions of the connectorized cable aligning in the various recesses and spaces of the clamp member 13a that correspond with those of the clamp member 13b just described.

The assembled connectorized cable and clamp as subassembly 18 then are inserted into the housing 14, as is illustrated in the drawings.

In FIG. 6 the subassembly 18 of the clamp 13 with the connector 12 and optical cable 11 attached to the clamp is shown partly inserted into the housing 14. Interior 17 of the housing has a feature 70 that provides an interference fit with the clamp 13 so as to urge the clamp members 13a, 13b together while the interaction of the clamp with the connector body area 33a, flange 32, ferrule parts 37a, 37b, retains the connector with respect to the clamp 13 to tend to minimize lateral or axial movement of the connector with respect to the clamp. Thus, there is a secure mechanical connection to and retention of the connector 12 and optical cable 11 with respect to the clamp. In FIG. 6 that feature is a narrowing or tapering of the cross-sectional area, diameter, etc., so that the further the clamp is inserted into the interior 17, the stronger is the compression or force or pressure provided by the housing against the clamp urging the clamp members toward each other and toward the connector 12 and toward the optical cable 11. Alternatively, the mentioned feature may be a tapering or enlarging of the exterior cross-sectional dimension of the clamp 13 from the back end toward the front end thereof so that the further the clamp is pushed into the interior 70 of the housing 14, the mentioned compression or force is increased against the clamp. Other features alternatively or additionally may be used to provide such compression force, e.g., one or more protrusions or protruding surfaces of the housing interior and/or of the clamp.

The cross-sectional shape of the hollow interior 17 where the clamp 13 is inserted and placed is of generally the same shape as the exterior shape of the clamp 13 so that the clamp (with the connector 12 and optical cable 11 coupled to the clamp) initially may be easily, smoothly inserted unimpeded into the hollow interior. In the illustrated embodiment the clamp 13 has a generally rectangular exterior cross-sectional shape with some degree of curvature at respective corner areas, and the hollow interior 17 is of a similar shape, as was mentioned. As is shown in FIG. 7, the housing 14 is generally in an elongate cylindrical shape having the hollow interior 17 through which the optical cable 11 may pass and into which the clamp 13 with the connector 12 held by the clamp may be inserted at the entrance 15. As was mentioned above, the feature 70 of the housing 14 that effects gradual compression against the clamp is a tapering or gradual narrowing of the cross-sectional area, e.g., the interior space, of the hollow interior 17.

At the front end of the entrance 15 are overhanging surfaces 71 between which are respective gaps 72. The clamp 13 may be inserted into the hollow interior 17 via the entrance 15, for example, until the front end of the clamp is fully recessed in the hollow interior 17, on the one hand, but still leaving the optical connection end 21 of the connector 12 accessible both at the front of the housing 14 and laterally at the area of the gaps 72. This arrangement can be seen in FIG. 2, for example. The gaps 72 facilitate manual grasping of the connector 12 to pull it and the clamp 13 out from the hollow interior 17 of the housing 14 if such removal is desired. Flat surfaces 73 are provided at the exterior surface of the housing 14 in the area of the entrance 15 to facilitate manually manipulating the housing 14.

Raised surfaces 74, 75 near the front end of the housing 14 provide a groove or slot 76 for receiving an O-ring 75. Another O-ring 78 is placed in engagement with the back face of the raised surface 75. The raised surfaces 74, 75 and grooves 76 circumscribe the exterior surface of the housing 14 adjacent the entrance area 15 and facilitate proper positioning of the O-rings; and the O-rings provide a watertight sealing function between the housing 14 and a coupler 80.

The coupler 80 is a fitting that has a hollow interior to fit over the outside of the housing 14. The coupler 80 has an exterior thread 81 at the forward end, and has a number of flats or flat surfaces 82 to facilitate manually manipulating the coupler. The coupler 80 may be slid over the exterior surface of the housing 14 from the back end toward the forward end to engage the O-ring 78 and/or the raised surface 75.

With the coupler 80 so positioned, e.g., as is illustrated in FIGS. 2 and 3, the dust cap 20 may be placed over the forward end 15 of the housing 14 to enclose the optical connection end 21 of the connector 12 and may be secured (e.g., screwed on) to the threads 81 of the coupler. The O-ring 78 cooperates with the housing 14 and also with the coupler 80 and the O-ring 77 cooperates with the housing 14 and also with the dust cap 20 (or other device to which the termination system is attached) to provide a substantially fluid-tight seal or watertight seal for the termination system 10. The fluid-tight or watertight seals at both ends of the housing 14 help to assure that the interior 17 would tend to remain dry and otherwise uncontaminated.

In use of the termination system 10 for optical coupling with another device, the dust cap 20 may be removed, and the termination system may be attached to a further device using the threads 81 of the coupler 80 while the O-rings 77, 78 provide a sealing function as described just above.

The strain relief 18 includes at the exit end 16 of the housing 14 a number of extending finger-like projections or protrusions (fingers) 90. The fingers 90 have a degree of resilience allowing them to be deformed inwardly or outwardly. The strain relief 19 further includes a sleeve 91 that has a hollow interior passage 92 of a shape and size that conforms to or is substantially the same as the cross-sectional exterior shape of the optical cable 11. Thus, the sleeve 91 is configured to have the optical cable 11 fit in and through the interior 92 so that the sleeve can be slid along the outside of the optical cable. The strain relief 19 also includes a cap 93 that has a hollow interior passage 94 that is configured to fit over the optical cable 11 and over part of the sleeve 91. The interior of the cap 93 is threaded at 94. Those threads are intended to secure the cap to the threads 95 at the exit end 16 of the housing 14.

As is seen in FIG. 8, the cap 93 has a tapered interior surface. It has a relatively wider diameter interior area 96 at the entrance where the threads begin and further in it tapers at surface 97 to a relatively narrower diameter area at exit opening 98.

In assembling the strain relief 19 of the termination system 10, the sleeve 91 is slid along the optical cable 11, and the cap 93 also is slid along the optical cable 11. The sleeve 91 is pressed into the hollow interior 17 of the housing 14 so that part of the sleeve 91 is beneath the fingers 90, e.g., fits within the opening defined collectively by the fingers. More specifically, As the cap 93 is screwed onto the thread 95, the interior of the cap compresses the fingers 90 into engagement with the sleeve 91, and interior tapered wall 97 of the cap 93 engages the sleeve to form a watertight seal.

To assemble the termination system 10 with a connectorized cable, e.g., the fiber optic member 23 is attached to the connector 12, the housing 14 and the optical cable 11 with a connector 12 attached to it, the optical cable is inserted through the hollow interior 17 of the housing 14 such that the optical cable extends in the housing 14 and beyond both ends 15, 16 of the housing leaving the optical connector exposed outside the hollow interior of the housing. The clamp members 13a, 13b are placed about at least part of the optical connector 12 and about at least part of the optical cable such that at least part of a fiber optic member of the optical cable extends in a path in at least one of the clamp members.

The clamp members are aligned to provide an enclosure for at least part of the optical connector 12 and fiber optic member 23 and to retain the optical connector and the fiber optic member in the clamp. The subassembly 18 of the clamp members with the optical connector and fiber optic member is then inserted in the hollow housing such that upon such insertion the housing and the clamp members cooperate to urge the clamp members together to tend to resist withdrawing of the clamp and the optical connector from the housing. The O-rings 77, 78 may be placed over the outside surface of the housing 14 and slid along or rolled along that outside surface to place the O-ring 77 in the groove 76 and the O-ring 78 into engagement with the raised surface 75. The coupler may be slid along the outside surface of the housing 14 toward the O-rings 77, 78 such that the forward edge 81a of the coupler engages the surface 75 and/or O-ring 78 in sealed engagement therewith, such sealing provided by the O-ring.

The sleeve 91 and cap 93 may be slid along the optical cable 11 to a position locating at least part of the sleeve into the hollow interior 17 of the housing 14 in the area where the fingers 90 are located. The cap 93 may be tightened onto the housing 14 by screwing it onto the threads 95. As the cap is screwed onto those threads, the interior surfaces of the cap compress the fingers 90 resiliently urging them toward the sleeve 91 to hold securely to the optical cable. The engaged exterior surface of the sleeve 91 and tapered interior surface 97 of the cap 93 urge the sleeve against the optical cable 11 compressing the sleeve between the optical cable and the cap to provide a fluid-tight seal.

The interior of the housing 14 is, accordingly, in fluid-tight sealed relation to the exterior of the termination system as provided by the sealing interaction of the O-rings 77, 78 with respective mechanical surfaces, as described above, and the resilient engagement of the sleeve 91 with the cap 93 and optical cable 11, as described above.

The preferred embodiments of the present disclosure are described above with reference to the drawings. Many features and advantages of those embodiments are apparent from the detailed Specification, thus the accompanied claims intend to cover all such features and advantages of those embodiments which fall within the spirit, scope and connotation thereof. The embodiments of the present disclosure are not limited to the exact structures and operations as illustrated and described, and they cover all suitable modifications and equivalents falling within the scope of the claims.

The embodiments claimed are, as follows:

1. A termination system for an optical cable, comprising
a clamp, including a plurality of clamp members,
a cable guiding space in at least one of the clamp members, the cable guiding space configured to guide an optical cable in position in the clamp,
a connector receiving space in the clamp configured to receive at least part of a connector connected to the optical cable, a stop configured to block withdrawal of the connector from the clamp, a housing having a clamp receiving space configured to receive at least part of the clamp and to urge the clamp members together to retain in the clamp at least part of the connector, wherein the housing comprises a tubular member having a hollow axial passage therein, the passage having an entrance end and an exit end, the clamp receiving space at the exit end of the passage, the passage of the tubular member configured for an optical cable located therein to extend from the entrance end to a connector at the connector receiving space, and a strain relief coupling for a fiber optic cable, including
a plurality of fingers extending at the entrance end of the hollow tubular member in a direction generally parallel to an axial extent of the passage, a resilient sleeve positionable around a fiber optic cable, the resilient sleeve of a size as to fit resiliently at least part way in the entrance end engaged with a plurality of the fingers, and an urging member positionable on the tubular member at the entrance end configured to urge the fingers into engagement with the resilient sleeve to tend to retain the resilient sleeve in the tubular member and to urge the resilient sleeve toward the fiber optic cable to tend to retain the fiber optic cable in the tubular member.

2. The termination system of claim 1, further comprising an optical connector and the optical cable, the optical connector being configured to be assembled with the optical cable in the field, the optical connector comprising a connector housing including a light transmissive connection to a fiber optic member of the optical cable, a ferrule attachable to the connector housing to hold the fiber optic member of the optical cable to the connector housing in optical connection with the light transmissive connection, the fiber optic member extending through the housing from an entrance end of the housing to the optical connector.

3. The termination system of claim 2, wherein the connector receiving space in the clamp is configured to mate with at least part of the connector housing and ferrule for positioning and retaining them in the clamp.

4. The termination system of claim 3, wherein the strain relief is configured to resist pulling of the fiber optic cable out from the housing, and wherein the clamp resists pulling of the optical connector out from the housing.

5. The system of claim 2, wherein the connector, clamp and housing are field installable with respect to an optical cable.

6. The system of claim 1, wherein the clamp members are positionable in relation to each other to form a tube.

7. The system of claim 6, wherein the tube has an entrance end, an exit end, and a hollow interior portion in which the connector is retained at the exit end and through which a fiber optic member of an optical cable may extend from the entrance end to the connector.

8. The system of claim 1, wherein a tube is at least partly positionable in the clamp receiving space, and wherein at least one of the clamp receiving space or the clamp includes a feature that provides an interference fit of the clamp in the clamp receiving space to urge the clamp members together.

9. The system of claim 8, wherein the feature that provides an interference fit comprises a tapered portion of a hollow portion of the tube in at least a portion of the clamp receiving space.

10. The system of claim 9, wherein the tapered portion is of a varying cross-sectional dimension along at least part of its length, whereby as the clamp is inserted into the clamp receiving space along an axial extent of the tapered portion, the clamp members are urged together and the clamp becomes securely retained in the housing and retains the connector in the clamp.

11. The system of claim 1, wherein the clamp securely holds the connector in response to urging together of the clamp members by the housing.

12. The system of claim 1, wherein at least one of the clamp receiving space or at least one of the clamp members is tapered to increase urging of the clamp members together in response to increasing the amount of inserting of the clamp members into the clamp receiving space.

13. The system of claim 1, further comprising a fastener configured to hold the clamp members together.

14. The system of claim 13, wherein the fastener comprises cooperative male and female members respectively on one or more of the clamp members.

15. The system of claim 14, wherein at least one male member comprises a male protrusion with a tab surface of one clamp member, and at least one female member comprises a mating ledge for engagement by the tab surface.

16. The system of claim 14, further comprising alignment guides configured to align the clamp members with respect to each other in position for attaching to each other.

17. The system of claim 16, wherein the alignment guides comprise a recess in one clamp member and a protruding pin member in the other clamp member configured for inserting into the recess.

18. The system of claim 1, wherein the clamp is generally cylindrical and extends in an axial direction along a length thereof, wherein the cable guiding space extends in the clamp toward the connector receiving space along the direction of the clamp.

19. The system of claim 18, wherein the clamp includes strength member receiving space to receive a strength member of a fiber optic cable.

20. The system of claim 1, wherein the resilient sleeve, hollow tubular member and urging member are cooperative with a fiber optical cable retained thereby to provide a fluid-tight seal.

21. A system for a fiber optic cable, comprising
a clamp including a connector receiving space configured to receive at least part of a connector connected to the fiber optic cable,
a stop configured to block withdrawal of the connector from the clamp,
a strain relief coupling for the fiber optic cable, comprising
a hollow tubular member having an entrance end and an exit end in which the fiber optic cable may be located, the tubular member having an axial extent,
at least part of the entrance end having a plurality of fingers extending in a direction generally parallel to the axial extent,
a resilient sleeve positionable around the fiber optic cable, the resilient sleeve of a size as to fit resiliently at least part way in the entrance end engaged with a plurality of the fingers, and
an urging member positionable on the tubular member at the entrance end configured to urge the fingers into engagement with the resilient sleeve to tend to retain the resilient sleeve in the tubular member and to urge the resilient sleeve toward the fiber optic cable to tend to retain the fiber optic cable in the tubular member,
wherein the hollow tubular member has a clamp receiving space at the exit end, the clamp receiving space being configured to receive at least part of the clamp, configured to retain the at least part of the clamp in the hollow tubular member, and configured to urge the clamp to hold the fiber optic cable.

22. A method of assembling a termination system for a connectorized optical cable, comprising
placing relative to each other a hollow housing and an optical connector that has an optical cable attached thereto such that the optical cable extends in the hollow housing and exits both a first end and a second end of the hollow housing such that the optical connector is exposed outside of a hollow interior of the hollow housing, wherein the hollow housing has a plurality of fingers extending at the second end of the hollow housing in a direction generally parallel to an axial extent of the hollow housing, placing clamp members about at least part of the optical connector with at least part of a fiber optic member extending in a path in at least one of the clamp members, aligning the clamp members to provide an enclosure for at least part of the optical connector and fiber optic member and to retain the optical connector and fiber optic member in the clamp members, inserting the clamp members with the optical connector and fiber optic member therein in the first end of the hollow housing such that upon such inserting the housing and the clamp members cooperate to urge the clamp members together to tend to resist withdrawing of the clamp and the optical connector from the hollow housing.

23. The method of claim 22, further comprising applying the plurality of fingers as a strain relief at the second end of the hollow housing to resist pulling out of the optical cable from the hollow housing.

* * * * *